(12) United States Patent
Godat et al.

(10) Patent No.: US 9,671,759 B2
(45) Date of Patent: Jun. 6, 2017

(54) TIME BASE INCLUDING AN OSCILLATOR, A FREQUENCY DIVIDER CIRCUIT AND CLOCKING PULSE INHIBITION CIRCUIT

(71) Applicant: EM Microelectronic-Marin SA, Marin (CH)

(72) Inventors: Yves Godat, Cornaux (CH); Nicolas Jeannet, Chambrelien (CH); François Klopfenstein, Delémont (CH)

(73) Assignee: EM Microelectronic-Marin SA, Marin (CH)

( * ) Notice: Subject to any disclaimer, the term of this patent is extended or adjusted under 35 U.S.C. 154(b) by 96 days.

(21) Appl. No.: 14/606,092

(22) Filed: Jan. 27, 2015

(65) Prior Publication Data

US 2015/0253737 A1    Sep. 10, 2015

(30) Foreign Application Priority Data

Mar. 6, 2014    (EP) .................................... 14158103

(51) Int. Cl.
*G04G 3/02*        (2006.01)
*G04C 3/08*        (2006.01)
(Continued)

(52) U.S. Cl.
CPC ............... *G04C 3/08* (2013.01); *G04G 3/022* (2013.01); *G04G 3/04* (2013.01); *G06F 1/08* (2013.01); *G06F 1/06* (2013.01)

(58) Field of Classification Search
CPC ........... G04G 3/022; G04G 3/04; H03K 23/00
(Continued)

(56) References Cited

U.S. PATENT DOCUMENTS 3,798,428 A * 3/1974 Izawa .................... G04G 3/022
                                                                    377/129
4,305,041 A * 12/1981 Frerking ................ G04G 3/027
                                                                    327/113
(Continued)

FOREIGN PATENT DOCUMENTS

EP    0 253 227 A1    1/1988
EP    0 999 483 A1    5/2000

OTHER PUBLICATIONS

European search report issued in corresponding application 14 15 8103, completed Sep. 4, 2014.

*Primary Examiner* — Amy Cohen Johnson
*Assistant Examiner* — Jason Collins
(74) *Attorney, Agent, or Firm* — Oblon, McClelland, Maier & Neustadt, L.L.P.

(57) ABSTRACT

The time base includes an oscillator generating a periodic signal, a frequency divider circuit formed by a division chain defining several division stages and a circuit for adjusting the divided frequency by inhibiting, in each inhibition period of a plurality of successive inhibition periods, an integer number of clocking pulses at the input of a given stage of the division chain. The time base is arranged to produce, in each inhibition period, a first real number corresponding to the real number of clocking pulses that must be removed to be precise and the adjustment circuit is arranged to calculate, in each inhibition period, a second real number equal to the addition of the first real number and the fractional part of the second real number obtained in the preceding inhibition period, the integer part of this second real number defining the number of clocking pulses to be inhibited in each inhibition period.

14 Claims, 1 Drawing Sheet

(51) Int. Cl.
  *G06F 1/08* (2006.01)
  *G04G 3/04* (2006.01)
  *G06F 1/06* (2006.01)

(58) Field of Classification Search
  USPC .................................................. 368/160, 201
  See application file for complete search history.

(56) References Cited

U.S. PATENT DOCUMENTS

| | | | | |
|---|---|---|---|---|
| 4,763,309 | A | 8/1988 | Decombes | |
| 5,327,404 | A * | 7/1994 | Nolan | G04G 3/02 368/201 |
| 5,530,407 | A * | 6/1996 | Yabe | G04G 3/02 327/113 |
| 6,120,178 | A * | 9/2000 | Meusburger | G04G 3/022 368/201 |
| 6,809,993 | B1 * | 10/2004 | Muller | G04G 99/00 368/238 |
| 8,392,001 | B1 * | 3/2013 | Isik | G04G 3/025 368/200 |
| 8,896,359 | B1 * | 11/2014 | Ruffieux | G04G 3/04 327/262 |
| 8,901,983 | B1 * | 12/2014 | Ruffieux | G04G 3/022 327/262 |
| 2003/0076137 | A1 * | 4/2003 | Chakravarthy | H03K 23/68 327/115 |
| 2014/0152355 | A1 * | 6/2014 | Godat | G04G 3/022 327/117 |
| 2014/0176201 | A1 * | 6/2014 | Weltin-Wu | H03L 7/197 327/115 |

* cited by examiner

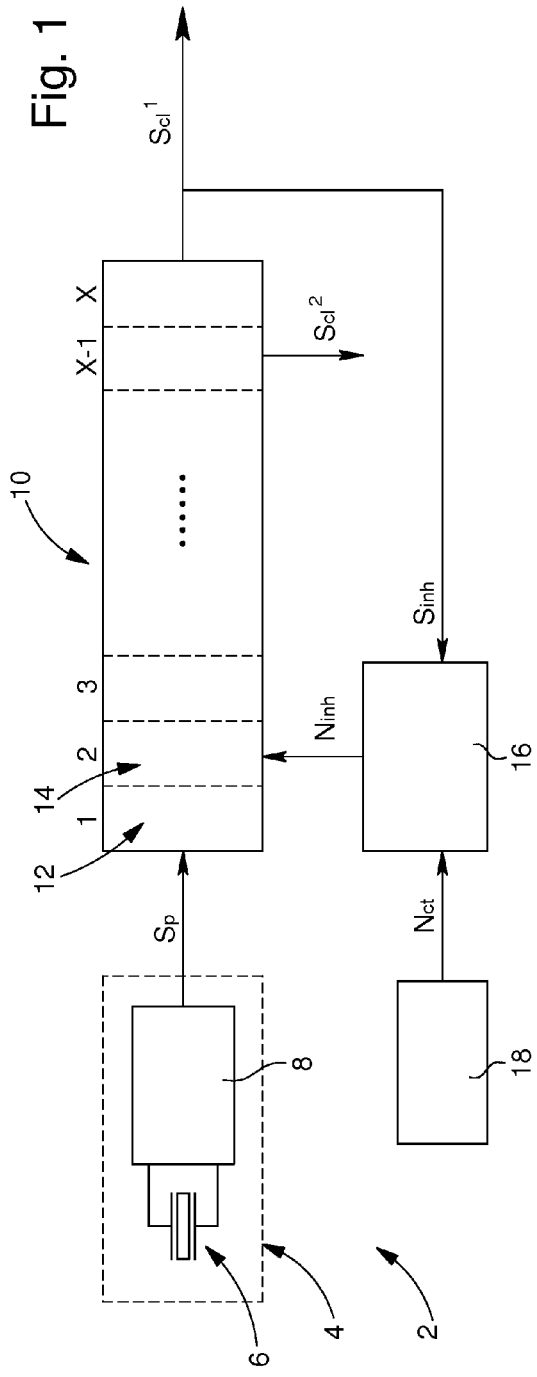
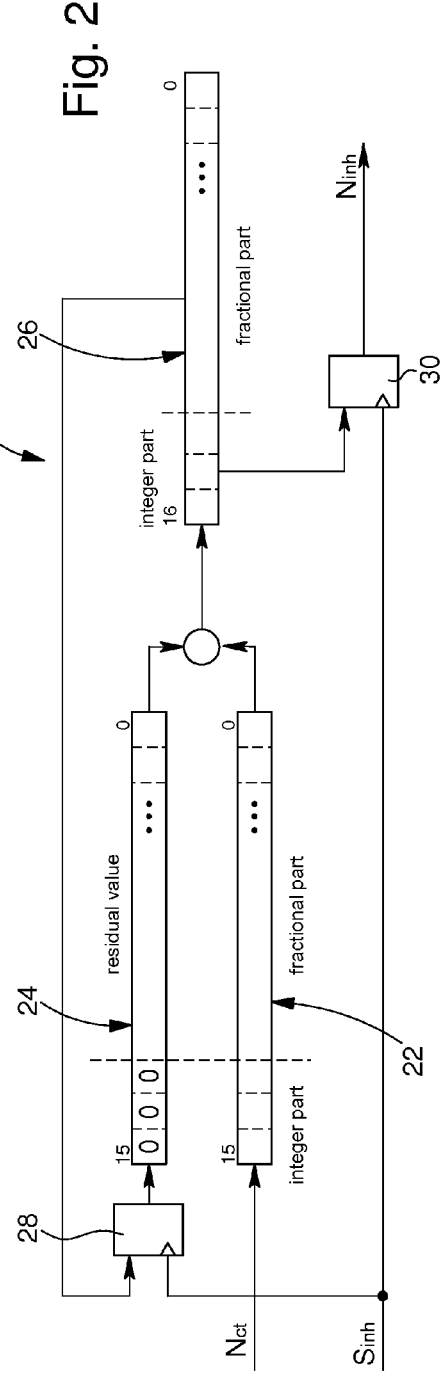

TIME BASE INCLUDING AN OSCILLATOR, A FREQUENCY DIVIDER CIRCUIT AND CLOCKING PULSE INHIBITION CIRCUIT

This application claims priority from European patent Application No. 14158103.3 filed Mar. 6, 2014, the entire disclosure of which is hereby incorporated herein by reference.

FIELD OF THE INVENTION

The present invention concerns the field of time bases providing a clock signal or several clock signals, whose frequency, respectively frequencies, is/are generated by a frequency divider circuit receiving, at input, a periodic signal generated by an oscillator, particularly a quartz oscillator.

BACKGROUND OF THE INVENTION

There are known time bases of the aforementioned type wherein there is provided a circuit for adjusting the frequency of the clock signal or the respective frequencies of several clock signals. This adjustment circuit is generally formed by a clocking pulse inhibition circuit in the division chain, the inhibition circuit being arranged to inhibit a certain integer number of clocking pulses at one stage in the division chain in each inhibition period. In general, it is arranged that the clocking pulses are inhibited in the first division stages to obtain improved resolution.

In particular, there are known electronic timepiece movements provided with such a time base, wherein the quartz oscillator produces a periodic signal whose frequency $F_{osc}$ is slightly higher than a frequency equal to 32.768 Hz (commonly called a 32 Hz signal). The frequency divider circuit is formed by a division-by-two chain. The choice of oscillator frequency is thus understood, since $32.768 = 2^{15}$. The inhibition circuit acts, for example, on the second division stage, more precisely at the input of the second stage where the clocking frequency corresponds to the oscillator frequency $F_{osc}$ divided by two. A reference frequency $F_{ref} = 32.768/2 = 16.384$ can thus be defined. The integer number $N_{inh}$ of clocking pulses to be inhibited in each inhibition period $P_{inh}$ is generally obtained by taking the rounded integer value of the difference between $F_{osc}^{det}/2$ and $F_{ref}$ multiplied by the inhibition period $P_{inh}$, namely $(F_{osc}^{det}/2 - F_{ref}) \cdot P_{inh}$ rounded to the unit, where $F_{osc}^{det}$ is the frequency determined for the periodic signal. This frequency determination is either obtained by an initial measurement, or by a calculation taking account of the measured temperature by using a predefined polynomial which expresses the dependency of the oscillator frequency as a function of temperature. The resolution obtained is thus given by $1/(2 \cdot F_{ref} \cdot P_{inh})$. It is therefore understood that, in order to increase the resolution and thus the precision of the time base long term, it is necessary to increase period $P_{inh}$. This situation causes a first problem arising from the fact that the maximum instantaneous error increases proportionally with this period $P_{inh}$. This problem may be crucial in a time base precision test performed over a relatively short test period, for example of several hours. Further, given that inhibition is generally performed in a short interval of each period $P_{inh}$, a second problem arises from the fact that the clock signal or signals is/are disrupted during this short interval. Thus, in each inhibition period, there is a signal with a non-adjusted frequency and, for example, at the end of the inhibition period, the intended integer number of clocking pulses is inhibited, with the clock signal then ceasing to provide a periodic signal during this inhibition.

SUMMARY OF THE INVENTION

It is an object of the present invention to overcome the aforementioned problems of the prior art by providing a time base having very high resolution and simultaneously a low maximum instantaneous error.

To this end, the present invention concerns a time base as claimed in claim 1, and a method for adjusting the frequency of at least one clock signal as claimed in claim 8.

BRIEF DESCRIPTION OF THE DRAWINGS

The invention will be described below with reference to the annexed drawings, given by way of non-limiting example, and in which:

FIG. 1 is a schematic view of a time base according to the invention with the various functional blocks of the time base; and FIG. 2 is a schematic view of the architecture of the circuit for adjusting the frequency of at least one clock signal of the time base of FIG. 1.

DETAILED DESCRIPTION OF THE INVENTION

A time base according to the invention will be described below with reference to FIGS. 1 and 2. This time base 2 includes:

an oscillator 4 generating a periodic signal $S_p$ having a natural frequency $F_{osc}$ higher than a reference value, a frequency divider circuit 10 formed by a division chain defining several division stages (referenced 1, 2, 3, ..., X–1, X), said divider circuit receiving, at input, periodic signal $S_p$ and delivering, at output, at least one clock signal $S_{cl}^{1}$ or $S_{cl}^{2}$ having a divided frequency, a divided frequency adjustment circuit 16 functioning by inhibiting, in each inhibition period $P_{inh}$ of a plurality of successive inhibition periods, an integer number $N_{inh}$ of clocking pulses at the input of a given stage 14 of the division chain.

The time base is arranged according to the invention to produce, in each inhibition period $P_{inh}$, a first real number $N_{ct}$ corresponding to an inhibition period $P_{inh}$ multiplied by the difference between a determined clocking frequency $F_{ct}$, produced by the division stage preceding the given stage 14 or by the oscillator when the given stage is the first stage of the division chain, and a reference frequency $F_{ref}$ for clocking the given stage. In other words, the first real number $N_{ct}$ is given by the following mathematical expression:

$$N_{ct} = P_{inh} \cdot (F_{osc}^{det} - F_{osc}^{ref})/K_{Div} \qquad (1)$$

where $F_{osc}^{det}$ is the determined frequency of periodic signal $S_p$ produced by oscillator 4, $F_{osc}^{ref}$ the reference value for the oscillator frequency, and $K_{Div}$ the division coefficient between the input of frequency divider circuit 10 and the input of the given stage of the division chain where the clocking pulse inhibition occurs. Thus, $F_{ct} = F_{osc}^{det}/K_{Div}$ and $F_{ref} = F_{osc}^{ref}/K_{Div}$. In a first variant where the given stage is the first stage 12 of the division chain, $K_{Div} = 1$. In a second variant where the given stage is the second stage 14 of a division-by-two chain, $K_{Div} = 2$.

Next, the divided frequency adjustment circuit 16 is arranged to calculate, in each inhibition period (n=1, 2, 3, ..., etc.), a second real number $NB^n$, which, in a first inhibition period (n=1), is equal to the first real number $N_{ct}$ (thus $NB^1=N_{ct}$) and then, in each subsequent inhibition period, is equal to the addition of this first real number and the fractional part of the second real number $NB^{n-1}$ obtained for the preceding inhibition period. The integer number of clocking pulses to be inhibited in each inhibition period is given by the integer part of the second real number $NB^n$ calculated in that inhibition period.

In the variant shown in FIG. 1, oscillator 4 is formed by a quartz resonator 6 associated with an electronic circuit 8 providing a digital periodic signal $S_p$. The first real number is produced by an electronic unit 18, which may, in a simple variant, be formed by a memory into which the real number is initially introduced. In a more advanced variant which will be explained below, electronic unit 18 is an electronic circuit capable of performing certain calculations, or a microprocessor.

It will be noted that, in FIG. 1, the inhibition signal $N_{inh}$ is delivered to the second stage 14 of the frequency divider circuit. However, this is simply a preferred variant which in no way limits the invention. It will be noted that the inhibition signal is referenced by the integer number $N_{inh}$ of clocking pulses inhibited per inhibition period, to simplify the explanation of the invention. It will also be noted that, in FIG. 1, two clock signals $S_{cl}^1$ and $S_{cl}^2$ are shown at the output of the frequency divider circuit, the first clock signal $S_{cl}^1$ being produced at the end of the division chain, whereas the second clock signal $S_{cl}^2$ is produced by the penultimate stage X−1 of the division chain which includes X division stages. This example is in no way limiting. Indeed, in a variant, the time base can deliver a single clock signal and in another variant, more than two clock signals. Further, it is possible to arranged that a clock signal is produced at the output of any of the division stages downstream of the division stage where inhibition is performed, and even at the output of that given division stage.

In the case where the temperature dependence of the oscillator frequency is not taken into account, the first real number $N_{ct}$ is initially calculated using the mathematical formula (1) given above, following a measurement of the oscillator frequency $F_{osc}^{det}$. $N_{ct}$ is then entered in a memory of the time base. In a preferred variant where the temperature is periodically measured by a temperature sensor associated with the time base, temperature dependence is given, in particular, by a polynomial of the following type:

$$N_{ct}=a(T-T_0)^4+b(T-T_0)^3+c(T-T_0)^2+d(T-T_0)+N_{ct}(T_0) \quad (2)$$

By way of example, $T_0=20°$ may be chosen. The oscillator frequency $F_{osc}^{det}$ is measured at 20° and $N_{ct}(20°)$ is calculated using mathematical formula (1). As regards the value of the parameters a, b, c and d of polynomial (2), two solutions may be envisaged: Either these parameters are determined for a batch of oscillators, on the basis of theoretical or empirical measurements and/or knowledge of resonator 6 and are initially entered in all the time bases of the batch; or several frequency measurements are made for each oscillator 4 at various temperatures and thus the parameters are calculated for each oscillator and entered in each time base. Temperature T can be measured again for each inhibition period, but as the temperature normally changes slowly, and to save energy, the period of measurement of temperature T is generally greater than the inhibition period.

According to a variant with a quartz resonator, the reference value $F_{osc}^{ref}$ is equal to 32.768, and the division chain is a division-by-two chain. The stage where the inhibition is performed is the second stage 14 of the division chain and the reference frequency $F_{ref}$ is therefore equal to 16.384 Hz.

According to another variant, each inhibition period $P_{inh}$ has a duration equal to one second, this duration being defined by a clock signal $S_{inh}$ which is delivered to adjustment circuit 16 by frequency divider circuit 10 downstream of the inhibition stage of its division chain. If the last division chain X delivers a top second, signal $S_{inh}$ is here the clock signal $S_{cl}^1$ as shown in FIG. 1.

According to another variant, each inhibition period $P_{inh}$ has a duration equal to a fraction of a second, this duration being defined by a clock signal $S_{inh}$ which is delivered to adjustment circuit 16 by frequency divider circuit 10 downstream of the inhibition stage of its division chain. In the case of a division-by-two chain, the duration will preferably be equal to $½^Y$ of a second, y being an integer number greater than or equal to one. Thus, the clock signal $S_{inh}$ delivered to the adjustment circuit is directly generated by a frequency divider circuit delivering an adjusted clock signal with a frequency at $2^Y$ Hz.

According to a variant already mentioned above, the time base is arranged to produce a plurality of adjusted clock signals which are generated by the respective outputs of a plurality of division stages different from the division chain of frequency divider circuit 10, this plurality of stages being selected from among the inhibition stage and the division stages downstream of the inhibition stage.

According to one embodiment of adjustment circuit 16 shown in FIG. 2, the first real number $N_{ct}$ and the second real number defined above are loaded in two respective registers 22 and 26. These two registers each have at least N bits for their fractional part, N being an integer number greater than one. The first real number $N_{ct}$ is therefore determined with a precision of N numbers after the point. In a first variant, the number N is greater than five. In a second preferred variant, the number N is greater than or equal to ten.

In each inhibition period, the integer part of the second real number which is in register 26 is delivered via a flip-flop 30 to the frequency divider circuit which is arranged to process this data correctly by inhibiting a corresponding number of clocking pulses in the inhibition stage. The fractional part of register 26 is transferred via a flip-flop 28 in a register 24 forming a buffer memory. Once the integer part and the fractional part of register 26 have been transferred on reception of clock signal $S_{inh}$, the residual value which is in register 24 is added to the number $N_{ct}$ in register 22, the result of this addition being again entered in register 26. On the next clock signal $S_{inh}$, the integer part and the fractional part of register 26 are again transferred as indicated above, and so on for the subsequent inhibition periods. The fractional part of real number $N_{ct}$ is thus added, in each inhibition period, to the accumulated total of the fractional part in the preceding inhibition periods, and each time that the accumulated total reaches a value greater than or equal to one, the integer part of register 26 is increased by one unit. Thus, the number of inhibited clocking pulses on the next clock signal $S_{inh}$ is increased by one unit.

As a result of the features of the invention, the maximum instantaneous error can be kept low while obtaining high resolution for the clock signal(s) delivered by the time base, since the resolution no longer depends exclusively on the inhibition period, but also on the size of the fractional part register of the first and second real numbers. Indeed, in the time base according to the invention, resolution R is given by:

$$R=(1/P_{inh})\cdot(1/F_{ct})\cdot(½^N)$$

where N is the number of bits provided for the fractional part of the first and second real numbers in the respective registers 22 and 26, $F_{ct}$ the clocking frequency of the inhibition stage in the frequency divider, and $P_{inh}$ the inhibition period. It is therefore clear that the resolution can be very high, i.e. R is very small.

The present invention also concerns a method for adjusting the frequency of at least one clock signal produced by a time base as described above. Generally, this time base includes:

an oscillator generating a periodic signal having a natural frequency higher than a reference value, a frequency divider circuit formed by a division chain defining several division stages, said divider circuit receiving, at input, the periodic signal and delivering, at output, at least one clock signal with a divided frequency, a divided frequency adjustment circuit functioning by inhibiting, in each inhibition period of a plurality of successive inhibition periods, an integer number of clocking pulses at the input of a given stage of the division chain.

The method for adjusting the frequency of at least one clock signal according to the invention includes the following steps:

A) providing, in each inhibition period $P_{inh}$, a first real number $N_{ct}$ corresponding to inhibition period $P_{inh}$ multiplied by the difference between a determined clocking frequency, produced by the division stage preceding said given stage or by the oscillator when said given stage is the first stage of the division chain, and a reference frequency for clocking said given stage, B) calculating, in each inhibition period, a second real number which, in a first inhibition period, is equal to the first real number $N_{ct}$ and then in each subsequent inhibition period, is equal to the addition of said first real number and the fractional part of the second real number obtained for the preceding inhibition period, C) inhibiting, in each inhibition period, the integer part of the second real number calculated in said inhibition period.

What is claimed is:

1. A time base including:
    an oscillator generating a periodic signal having a natural frequency higher than a reference value,
    a frequency divider circuit formed by a division chain defining several division stages, said divider circuit receiving, at input, said periodic signal and delivering, at output, at least one clock signal having a divided frequency,
    a divided frequency adjustment circuit functioning by inhibiting, in each inhibition period of a plurality of successive inhibition periods, an integer number of clocking pulses at the input of a given stage of said division chain,
    wherein the time base is arranged to produce, in each inhibition period, a first real number corresponding to said inhibition period multiplied by the difference between a determined clocking frequency, produced by the division stage preceding said given stage or by the oscillator when said given stage is the first stage of the division chain, and a reference frequency for clocking said given stage, and in that the adjustment circuit is arranged to calculate, in each inhibition period, a second real number, which, in a first inhibition period, is equal to said first real number and then, in each subsequent inhibition period, is equal to the addition of said first real number and the fractional part of the second real number obtained in the preceding inhibition period, said integer number of clocking pulses to be inhibited in each inhibition period being given by the integer part of said second real number calculated in said inhibition period.

2. The time base according to claim 1, wherein said reference value is 32.768, and in that said division chain is a division-by-two chain, said given stage being the second stage of said division chain and said reference frequency being equal to 16.384 Hz.

3. The time base according to claim 1, wherein each inhibition period has a duration equal to one second, said duration being defined by a clock signal delivered by the time base downstream of said given stage.

4. The time base according to claim 1, wherein each inhibition period has a duration equal to a fraction of a second, said duration being defined by a clock signal delivered by the time base downstream of said given stage.

5. The time base according to claim 1, wherein said time base is arranged to deliver a plurality of adjusted clock signals which are generated by the respective outputs of a plurality of division stages, different from said division chain, from among a group including said given stage and the division stages downstream of said given stage.

6. The time base according to preceding claim 1, wherein said first real number and said second real number are loaded in two respective registers each having at least N bits for the fractional part thereof, the first real number being determined with a precision of N numbers after the decimal point; and in that the number N is greater than five.

7. The time base according to claim 1, wherein said first real number and said second real number are loaded in two respective registers each having at least N bits for the fractional part thereof, the first real number being determined with a precision of N numbers after the decimal point; and in that the number N is greater than or equal to ten.

8. A method for adjusting the frequency of at least one clock signal produced by a time base including an oscillator generating a periodic signal having a natural frequency higher than a reference value, a frequency divider circuit formed by a division chain defining several division stages, said divider circuit receiving, at input, said periodic signal and delivering, at output, said at least one clock signal with a divided frequency, a divided frequency adjustment circuit functioning by inhibiting, in each inhibition period of a plurality of successive inhibition periods, an integer number of clocking pulses at the input of a given stage of said division chain, said method for adjusting the frequency of at least one clock signal comprising:

A) providing, in each inhibition period, a first real number corresponding to said inhibition period multiplied by the difference between a determined clocking frequency, produced by the division stage preceding said given stage or by the oscillator when said given stage is the first stage of the division chain, and a reference frequency for clocking said given stage;

B) calculating, in each inhibition period, a second real number which, in a first inhibition period, is equal to said first real number and then in each subsequent inhibition period, is equal to the addition of said first real number and the fractional part of the second real number obtained for the preceding inhibition period; and C) inhibiting, in each inhibition period, the integer part of said second real number calculated in said inhibition period.

9. The method according to claim 8, wherein said reference value is 32.768, and in that said division chain is a division-by-two chain, said given stage being the second stage of said division chain and said reference frequency being equal to 16.384 Hz.

10. The method according to claim 8, wherein each inhibition period has a duration equal to one second, said duration being defined by a clock signal delivered by the time base downstream of said given stage.

11. The method according to claim 8, wherein each inhibition period has a duration equal to a fraction of a second, said duration being defined by a clock signal delivered by the time base downstream of said given stage.

12. The method according to claim 8, wherein said time base is arranged to deliver a plurality of adjusted clock signals which are generated by the outputs of a plurality of division stages, different from said division stage, from among a group including said given stage and the division stages downstream of said given stage.

13. The method according to claim 8, wherein said first real number and said second real number are loaded in two respective registers each having at least N bits for the fractional part thereof, the first real number being determined with a precision of N numbers after the decimal point; and in that the number N is greater than or equal to five.

14. The method according to claim 8, wherein said first real number and said second real number are loaded in two respective registers each having at least N bits for the fractional part thereof, the first real number being determined with a precision of N numbers after the decimal point; and in that the number N is greater than or equal to ten.

* * * * *